(12) United States Patent
Hanser et al.

(10) Patent No.: US 7,621,587 B1
(45) Date of Patent: Nov. 24, 2009

(54) HYDRAULIC SLIDABLE STORAGE FOR A RECREATIONAL VEHICLE

(75) Inventors: Paul E. Hanser, Tipton, IA (US); Stacy Hanser, Davenport, IA (US)

(73) Assignee: HWH Corporation, Moscow, IA (US)

(*) Notice: Subject to any disclaimer, the term of this patent is extended or adjusted under 35 U.S.C. 154(b) by 329 days.

(21) Appl. No.: 11/832,447

(22) Filed: Aug. 1, 2007

(51) Int. Cl.
    *B60R 5/04* (2006.01)
(52) U.S. Cl. ............. 296/156; 296/26.12; 296/26.13; 296/37.1; 296/37.6
(58) Field of Classification Search ........... 296/26.01, 296/26.12, 26.13, 37.1, 37.6, 164, 156; 414/522; 224/281, 538, 542–544, 554
    See application file for complete search history.

(56) References Cited

U.S. PATENT DOCUMENTS

| | | | | |
|---|---|---|---|---|
| 4,746,164 | A * | 5/1988 | Crean | 296/164 |
| 4,948,169 | A * | 8/1990 | Amundson | 280/769 |
| 5,125,710 | A * | 6/1992 | Gianelo | 296/37.1 |
| 5,921,615 | A * | 7/1999 | Gimenez | 296/164 |
| 6,022,181 | A * | 2/2000 | Wolterstorff et al. | 414/522 |
| 6,328,365 | B1 * | 12/2001 | Adsit | 296/37.6 |
| 6,776,451 | B2 * | 8/2004 | Crean | 296/156 |
| 7,204,538 | B2 | 4/2007 | Warlick, III et al. | |
| 7,219,941 | B1 * | 5/2007 | San Paolo et al. | 296/37.6 |
| 7,249,794 | B2 * | 7/2007 | Doyle | 296/37.1 |
| 7,407,211 | B2 * | 8/2008 | Kunz | 296/37.1 |
| 2005/0140170 | A1 * | 6/2005 | Crean | 296/156 |

OTHER PUBLICATIONS

Kwikee, SuperSlife ll PowerSlide Assembly Instructions, 2005, Rev. 2, Sep. 2005.
Kwikee, SuperSlide II and Trim Kit Installation, 2003, Rev. 1 Apr. 2003.
Kwikee, Product Service Training, pp. 1, 77, 78, 81, 85.
SlideMaster, SlideMaster Telescoping Cargo Handler brochure, "Make Life in Your RV Easier . . . ".
Kwikee, Super Slide Installation Instructions, 2004, Rev. 2 Feb. 2004.

\* cited by examiner

*Primary Examiner*—Glenn Dayoan
*Assistant Examiner*—Gregory Blankenship
(74) *Attorney, Agent, or Firm*—James C. Nemmers; Shuttleworth & Ingersoll, PLC

(57) ABSTRACT

A slidable storage tray adapted to be hydraulically actuated between a retracted position wherein the tray is nested inside a vehicle's storage compartment and an extended position wherein at least a portion of the tray is located outside of the vehicle's storage compartment. The slidable storage tray is dual directional so that it extends from either a first side or a second side of the vehicle. The hydraulic circuit comprises a first hydraulic cylinder and a second hydraulic cylinder. The rod of the first cylinder is attached to the vehicle/storage compartment frame and the rod of the second cylinder is attached to the slidable storage tray. The two hydraulic cylinders are attached together so their barrels cannot move relative to one another. The two hydraulic cylinders are facing the same direction so that their rods both extend in the same direction.

16 Claims, 4 Drawing Sheets

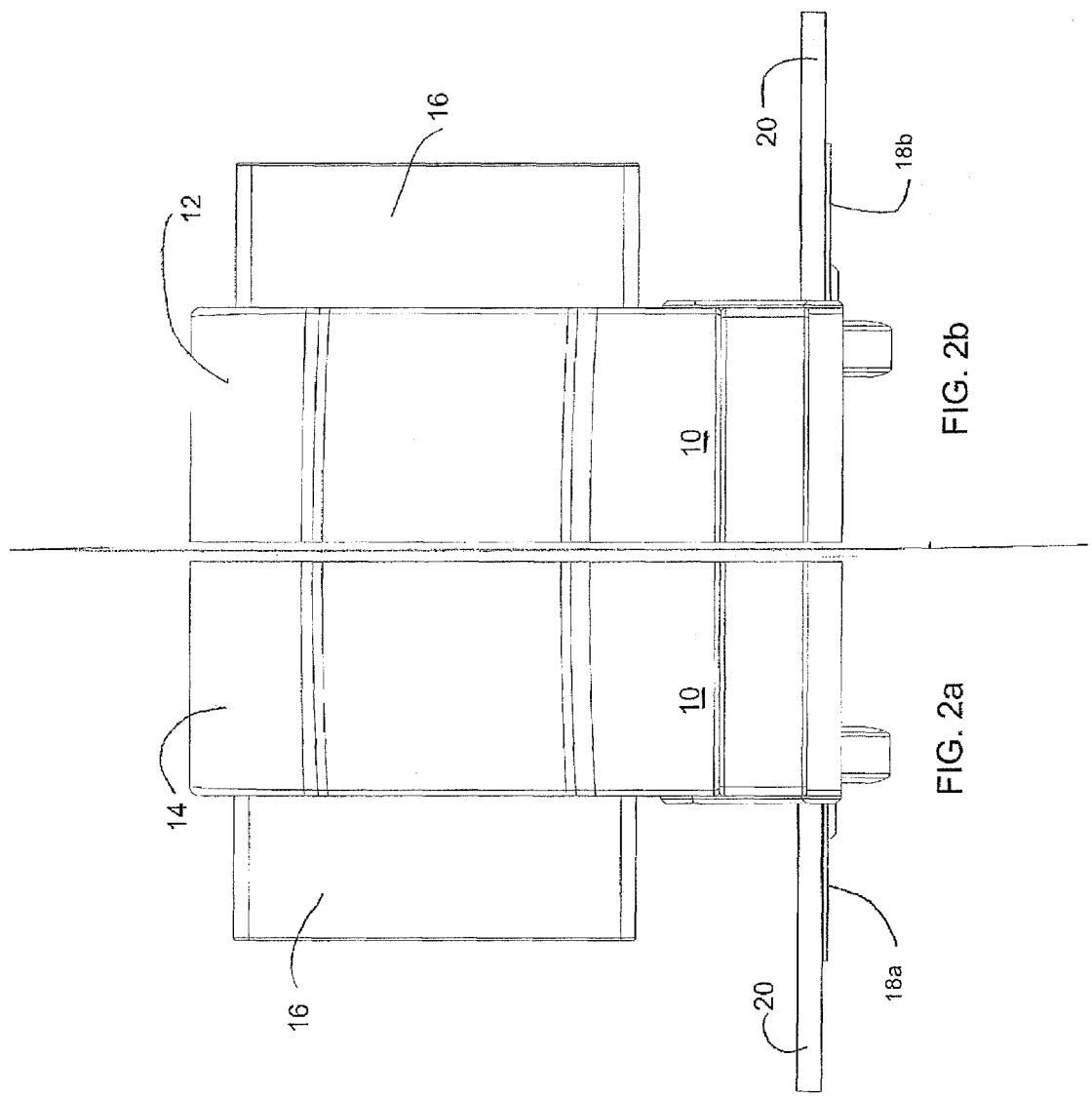

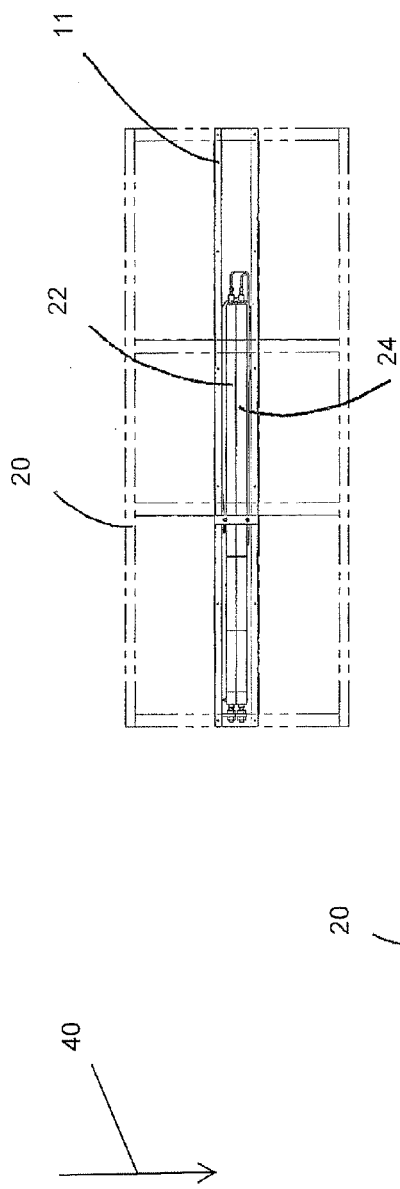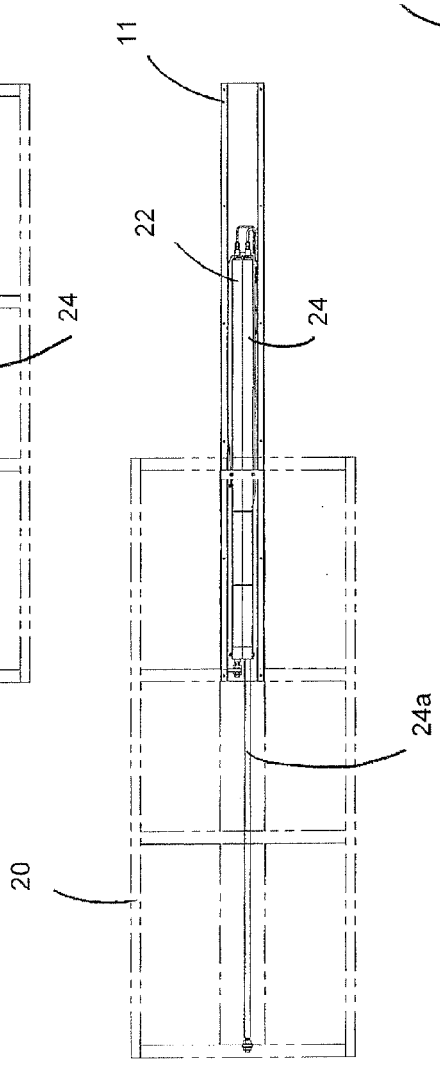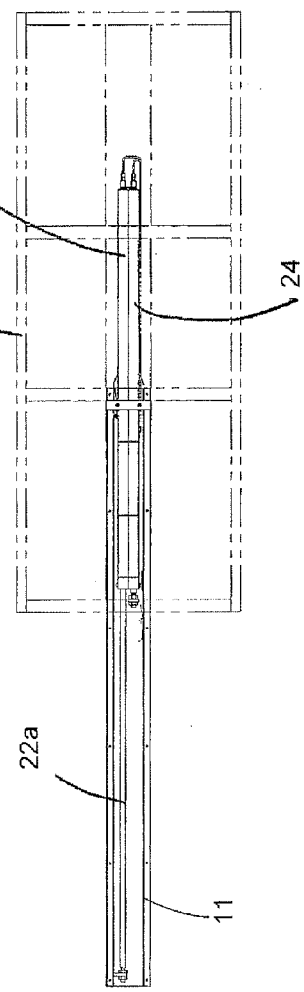

HYDRAULIC SLIDABLE STORAGE FOR A RECREATIONAL VEHICLE

BACKGROUND OF THE INVENTION

The present invention relates to a storage compartment having a slidable tray adapted to move between a retracted position wherein the tray is nested inside the storage compartment and an extended position wherein at least a portion of the try is located outside of the storage compartment to make it easier to access cargo on the tray.

Vehicles such as recreational vehicles and charter buses typically have cargo bays or storage compartments disposed within the vehicle body between the bottom of the vehicle and the floor of the vehicle. These storage compartments typically offer a generous amount of storage capacity that is accessible through cargo bay doors located on the outside of the vehicle. However, because these vehicles can be eight feet wide, cargo placed near the center of the storage compartments can be difficult to access without crawling inside the storage compartment. It can be especially difficult to access cargo in these storage compartments if the vehicle has an expandable room that extends outward beyond the sidewall of the vehicle when in its expanded position. (Vehicles having expandable rooms are generally described in U.S. Pat. No. 6,293,612 (Crean) which is hereby incorporated by reference.) Vehicles having expandable rooms require the user to crouch under the expandable room to access the storage compartment. This can be difficult and awkward for the user, especially if the user is elderly.

Several devices have been developed to assist users in accessing cargo in storage compartments by providing a slidable tray combined with the inside of the storage compartment. The slidable tray is adapted to move between a retracted position wherein the tray is nested inside the storage compartment and an extended position wherein at least a portion of the try is outside of the storage compartment. In the slidable tray's extended position, cargo is more readily accessible. Some existing slidable cargo trays are dual direction trays which means that the tray can extend from its nested position toward either the driver's side or the passenger's side of the vehicle. One type of slidable tray slides on rollers or bearings and is manually moved between its extended and retracted positions by the user. The problem with manual actuation of the slidable tray is that heavy cargo can make it difficult for users (especially elderly users) to move the tray between extended and retracted positions. Another problem with manually actuated slidable trays is that if the vehicle has an expandable room, the user must crouch under the expandable room (when in its expanded position) to pull the tray out from the storage compartment.

Another type of existing slidable storage tray uses an electric motor mounted on one side of the tray to move the tray between its extended and retracted positions. The tray slides on tracks having limit switches that tell the motor when to stop as the tray approaches the end of its track. There are several problems with using electric motors to move the slidable trays. One problem is that the limit switches can be misplaced or become damaged thereby causing the motor to stop at an incorrect location along the track. Another problem with this type of device is that the tray may bind on its track since power (i.e. the electric motor) is only being delivered to one side of the tray.

To the best of our knowledge, hydraulic cylinders have never previously been used to actuate a dual directional slidable storage tray device. One reason for this is because a design has not heretofore been presented that ensures that the hydraulic cylinders will be retracted inside the cargo bay when the tray is retracted inside the cargo bay. In other words, the difficulty with using hydraulic cylinders to actuate a dual directional tray is that situations may arise wherein a portion of one of the hydraulic cylinders (i.e. either the rod end or the barrel end) would be in an extended position outside the cargo bay even when the slidable tray is retracted inside the storage compartment. One of the features of this invention overcomes this problem by arranging the hydraulic cylinders in such a way that when the slidable tray is retracted inside the storage compartment, both cylinders are also retracted inside the storage compartment. Other features and benefits of this invention will be understood by the following disclosure.

SUMMARY OF THE INVENTION

The invention comprises a slidable storage tray that is adapted to move between a retracted position wherein the tray is nested inside a storage compartment of a vehicle and an extended position wherein at least a portion of the try is located outside of the storage compartment. The slidable storage tray is adapted to be hydraulically actuated to extend from its retracted position toward either a first side or a second side of the vehicle. The hydraulic circuit comprises a first hydraulic cylinder and a second hydraulic cylinder. The rod of the first cylinder is immovably attached to the storage compartment or vehicle frame and the rod of the second cylinder is attached to the slidable storage tray. The two hydraulic cylinders are attached together so their barrels cannot move relative to one another. The two hydraulic cylinders are facing the same direction so that their rods both extend in the same direction.

The hydraulic circuit further comprises at least one switch adapted to operate solenoid valves which control the movement of the two hydraulic cylinders. In one embodiment, the hydraulic circuit comprises two switches, one for controlling the tray's extension on the vehicle driver's side and one for controlling the tray's extension on the vehicle passenger's side. Each switch has an "extend" position and a "retract" position. When the driver's side switch is moved to its "extend" position, the slidable storage tray extends out of the cargo bay on the driver's side of the vehicle by extending the first cylinder and retracting the second cylinder. When the driver's side switch is moved to its "retract" position, both cylinders will retract. This will return the tray to its retracted position inside the vehicle storage compartment. In one embodiment, the operator cannot extend the tray out the passenger's side while operating the driver's side switch; however, the operator can move the tray into the vehicle's storage compartment using either switch.

When the passenger's switch is held in the "extend" position, the first cylinder retracts and the second cylinder extends thereby moving the slidable tray toward the passenger side. When the passenger's side switch is held in the "retract" position, both cylinders retract thereby returning the tray to its retracted position inside the vehicle's storage compartment. In one embodiment, the operator cannot extend the tray out the driver's side while operating the passenger's side switch; however, the operator can retract the slidable tray using either switch.

BRIEF DESCRIPTION OF THE DRAWINGS

FIG. 2a is a front view of a recreational vehicle wherein the slidable tray is extended on the passenger's side of the vehicle;

FIG. 2b is a front view of a recreational vehicle wherein the slidable tray is extended on the driver's side of the vehicle;

FIG. 3 is a top view of an embodiment of the invention showing the first cylinder, the second cylinder, the slidable tray, and the frame, wherein both cylinders are retracted causing the slidable tray to be in its retracted position;

FIG. 4 is a top view similar to FIG. 3 wherein the first cylinder is retracted and the second cylinder is extended causing the slidable tray to extended from the vehicle's passenger's side;

FIG. 5 is a top view similar to FIG. 3 wherein the first cylinder is extended and the second cylinder is retracted causing the slidable tray to extend from the vehicle's driver's side.

DETAILED DESCRIPTION OF THE INVENTION

Figure 1:
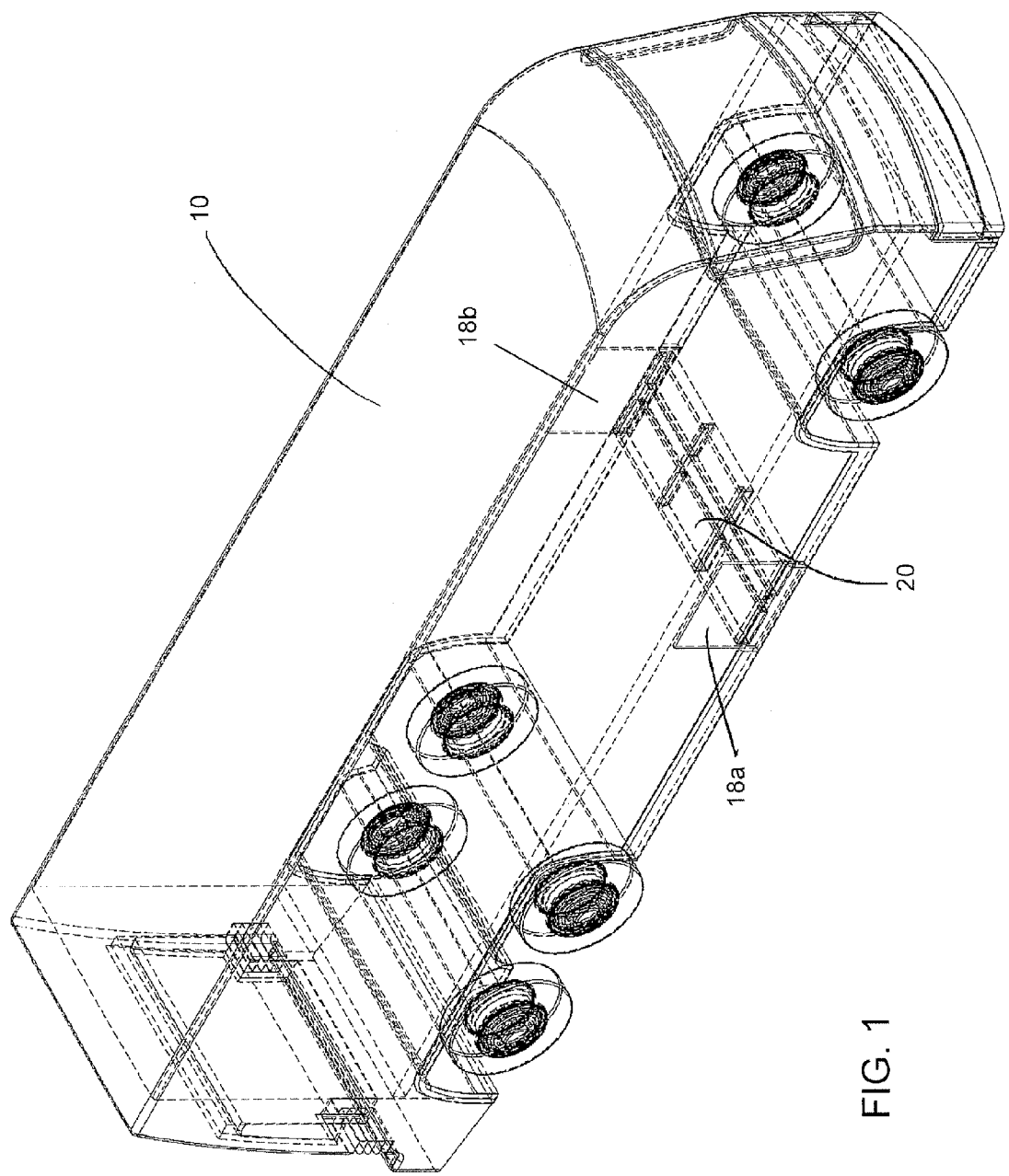
FIG. 1 is a perspective view of a recreational vehicle showing the slidable tray in its retracted position inside the vehicle's storage compartment.

As shown in FIGS. 1, 2a, and 2b, the invention comprises a slidable storage tray 20 that is adapted to move between a retracted position wherein the tray 20 is nested inside of a vehicle's 10 storage compartment and an extended position wherein at least a portion of the tray 20 is located outside of the storage compartment. As shown in FIGS. 2a and 2b, the slidable storage tray 20 is dual directional, i.e. it is adapted to extend from its nested position toward either the driver's side 12 or the passenger's side 14 of the vehicle 10. The invention is described herein as being used with a vehicle 10 as shown in FIG. 1, however, it should be noted that the present invention may be used with any other suitable object requiring dual directional movement.

The vehicle 10 shown in FIGS. 2a and 2b comprises an expandable room 16 adapted to extend from the vehicle's 10 sidewall when the vehicle 10 is stationary. In the embodiment shown in FIGS. 2a and 2b, the tray 20 is adapted to extend far enough from the vehicle's 10 sidewall so that a portion of it extends past the expandable room 16 when the expandable room 16 is in its expanded position. In most cases, tray 20 extension of about five feet from the vehicle 10 sidewall is sufficient for a portion of the tray 20 to extend beyond a standard expandable room 16 in its expanded position. This allows a user to extend the tray 20 and retrieve cargo from the storage compartment without having to crawl or stoop under the expandable room 16.

The vehicle 10 preferably comprises cargo bay doors 18a, 18b as shown in FIGS. 1, 2a, and 2b. In one embodiment, the cargo bay doors 18a, 18b are pivotally combined with the vehicle 10 sidewall near the lower edge of the storage compartment. The doors 18a, 18b are biased in their closed position (FIG. 1) by a spring or other suitable means. As described in more detail below, as the slidable tray 20 is moved to its extended position (FIGS. 2a and 2b), the slidable tray 20 contacts the inside of the cargo bay door 18a or 18b with enough force to pivot the door 18a or 18b to its open position thereby allowing the slidable tray 20 to extend from the storage compartment through the cargo bay door 18a or 18b. In some embodiments, the tray 20 slides along a track or a guide to help it extend and retract smoothly and linearly.

As shown in FIGS. 3-5, two hydraulic cylinders are used to actuate the slidable storage tray 20. The hydraulic cylinders are preferably situated under the tray 20 to allow cargo to be placed on top of the tray 20. FIGS. 3-5 are top views of the device wherein arrow 40 points toward the front of the vehicle 10. The first hydraulic cylinder comprises a barrel 22 and a rod 22a and the second hydraulic cylinder comprises a barrel 24 and a rod 24a. The rod 22a of the first cylinder is immovably attached to the vehicle 10 (or storage compartment) frame 11 and the rod 24a of the second cylinder is attached to the slidable storage tray 20. The two hydraulic cylinders are attached together so their barrels 22, 24 cannot move relative to one another. The two hydraulic cylinders are facing the same direction so that their rods 22a, 24a both extend in the same direction.

Figure 6:
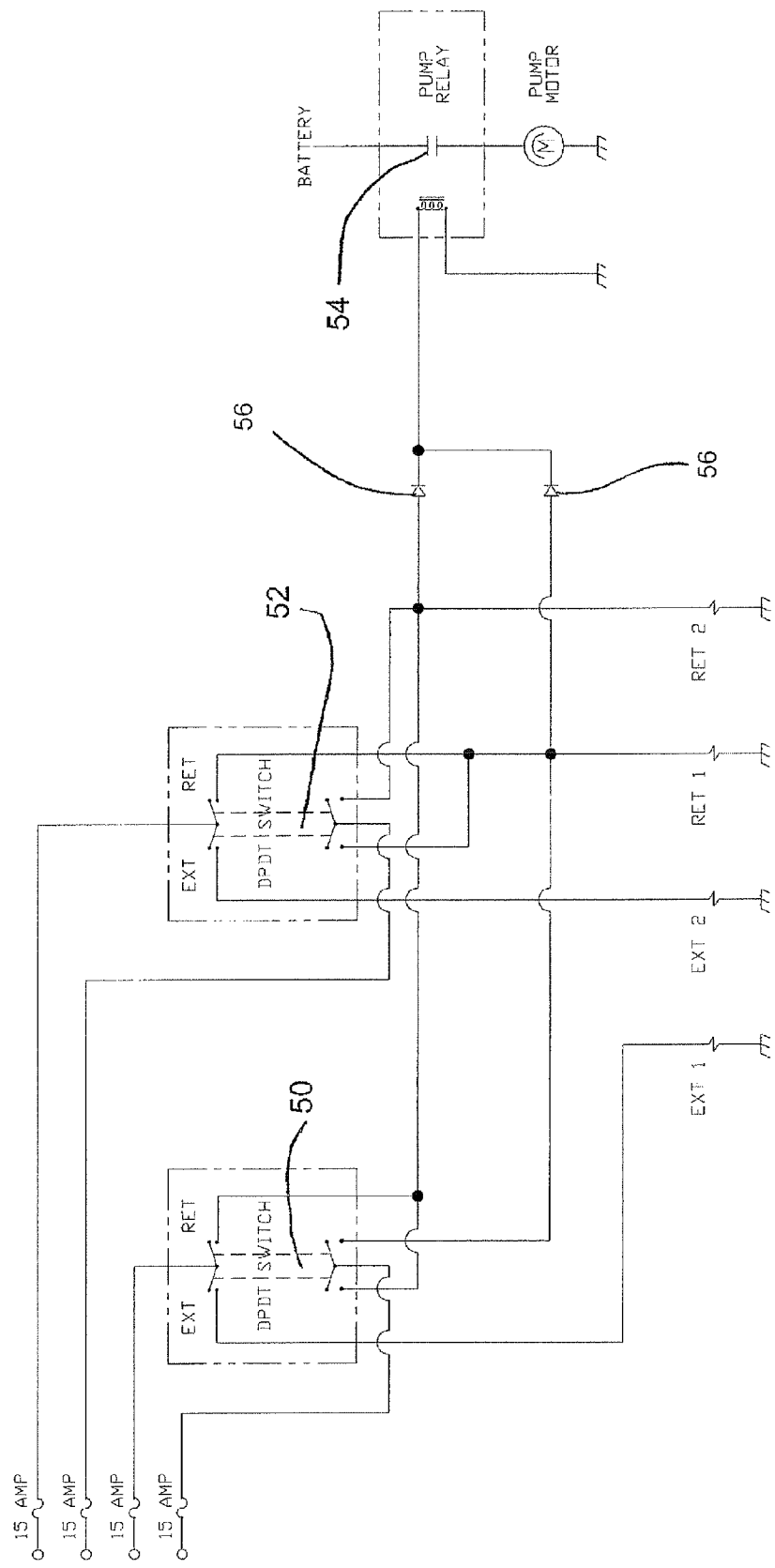
FIG. 6 is a schematic view of an embodiment of the electrical system of the invention.

FIG. 6 shows a schematic view of an embodiment of the invention. In one embodiment, the hydraulic circuit comprises at least one switch adapted to operate solenoid valves which control the movement of the two hydraulic cylinders. In the embodiment shown in FIG. 6, the hydraulic circuit comprises two switches 50, 52 wherein one switch 50 controls the tray's 20 extension on the vehicle driver's side 12 and one switch 52 controls the tray's 20 extension on the vehicle passenger's side 14. The switches 50, 52 may be located inside the vehicle's 10 cab, on the outside of the vehicle 10 on each respective side of the vehicle 10, on a remote control device, or in any other suitable location. Each switch 50, 52 has an "extend" position and a "retract" position. To extend the slidable tray 20, voltage is applied to the appropriate extend and retract valves, ext 1 and ret 2 as a pair for one direction or ext 2 and ret 1 for the other direction. To retract the slidable tray 20, voltage is applied to both retract valves, ret 1 and ret 2. The circuit is arranged so that both cylinders cannot be extended at the same time. The pump relay 54 is activated through the diodes 56 such that the pump 54 runs any time either switch is pressed in any direction.

When the driver's side switch 50 is moved to its "extend" position, the slidable storage tray 20 extends out of the cargo bay door 18b on the driver's side 12 of the vehicle 10 by extending the first cylinder and retracting the second cylinder. This ensures that the slidable tray 20 will move towards the driver's side 12 as shown in FIG. 5. The slidable tray 20 can move to its extended position on the driver's side 12 regardless of whether it starts from its retracted position inside the storage compartment or whether it starts from its extended position on the passenger's side 14. In other words, the slidable tray 20 can move from its fully extended position on the passenger's side 14 of the vehicle 10 to its fully extended position on the driver's side 12 of the vehicle 10 without stopping in its retracted position. As discussed above, as the slidable tray 20 extends it contacts the inside of the cargo bay door 18b with enough force to pivot the door 18b to its open position thereby allowing the slidable tray 20 to extend from the storage compartment through the cargo bay door 18b. When the driver's side switch 50 is moved to its "retract" position, the first cylinder will retract and the second cylinder will retract. This will return the tray 20 to the stored position inside the vehicle 10 storage compartment as shown in FIG. 3. Once retracted, the cargo bay door 18b will move back to its closed position since the tray 20 is no longer forcing it open. In the embodiment that uses two switches 50, 52, the operator cannot extend the tray 20 out the passenger's side 14 while operating the driver's side switch 50, however, the operator can move the tray 20 into the vehicle's storage compartment using either switch 50, 52.

When the passenger's side switch 52 is held in the "extend" position, the first cylinder retracts, and the second cylinder extends as shown in FIG. 4. This cylinders' movement ensures that the slidable tray 20 will move toward the passenger side 14 of the vehicle 10. The slidable tray 20 can move to its extended position on the passenger's side 14 regardless of whether it starts from its retracted position inside the storage compartment or whether it starts from its extended position on the driver's side 12. In other words, the slidable tray 20 can move from its fully extended position on the driver's side 12 of the vehicle 10 to its fully extended position on the passenger's side 14 of the vehicle 10 without stopping in its retracted position. As discussed above, as the slidable tray 20 extends it contacts the inside of the cargo bay door 18*a* with enough force to pivot the door 18*a* to its open position thereby allowing the slidable tray 20 to extend from the storage compartment through the cargo bay door 18*a*. When the passenger's side switch 52 is held in the "retract" position, both the first and second cylinders will retract thereby returning the tray 20 to its retracted position inside the vehicle 10 cargo bay as shown in FIG. 3. Once retracted, the cargo bay door 18*a* will move back to its closed position since the tray 20 is no longer forcing it open. In the embodiment that uses two switches 50, 52, the operator cannot extend the tray 20 out the driver's side 12 while operating the passenger's side switch 52, however, the operator can store the tray 20 in the vehicle's 10 storage compartment using either switch 50, 52.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. A storage system comprising:
   a storage compartment having a frame, a first side, and a second side;
   a slidable tray movable between a retracted position wherein the storage tray is nested inside of the storage compartment, a first extended position wherein the storage tray extends from the storage compartment first side, and a second extended position wherein the storage tray extends from the storage compartment second side;
   a first hydraulic cylinder having a barrel, a rod, a retracted position, and an extended position, wherein the rod of the first hydraulic cylinder is combined with the storage compartment frame; and
   a second hydraulic cylinder having a barrel, a rod, a retracted position, and an extended position, wherein the rod of the second hydraulic cylinder is combined with the slidable tray;
   wherein the slidable tray is in its retracted position when both cylinders are retracted, the slidable tray is in its first extended position when the first cylinder is extended and the second cylinder is retracted, and the slidable tray is in its second extended position when the second cylinder is extended and the first cylinder is retracted.

2. The storage system of claim 1 wherein the first hydraulic cylinder barrel and the second hydraulic cylinder barrel are combined together so the barrels cannot move relative to one another.

3. The storage system of claim 1 wherein the first hydraulic cylinder and the second hydraulic cylinder are aligned in the same direction.

4. The storage system of claim 1 wherein the storage compartment further comprises cargo bay doors.

5. The storage system of claim 4 wherein the cargo bay doors are pivotally combined with the storage compartment allowing them to move between a closed position and an open position.

6. The storage system of claim 5 wherein the cargo bay doors are biased in their closed position.

7. The storage system of claim 1 wherein the storage compartment is part of a recreational vehicle.

8. The storage system of claim 1 wherein both cylinders cannot be in their extended position at the same time.

9. A storage system for use with a recreational vehicle having a frame, a storage compartment, a driver's side, and a passenger's side, said system comprising:
   a tray adapted for movement between a retracted position wherein the tray is nested inside the storage compartment, a first extended position wherein the tray extends from the vehicle's driver's side, and a second extended position wherein the tray extends from the vehicle's passenger's side;
   a first hydraulic cylinder having a barrel, a rod, a retracted position, and an extended position, wherein the rod of the first hydraulic cylinder is combined with the vehicle's frame;
   a second hydraulic cylinder having a barrel, a rod, a retracted position, and an extended position, wherein the rod of the second hydraulic cylinder is combined with the tray so that when both cylinders are retracted the tray is in its retracted position, when the first cylinder is extended and the second cylinder is retracted the tray is in its first extended position, and when the first cylinder is retracted and the second cylinder is extended the tray is in its second extended position;
   a first cargo bay door that is pivotally combined with the storage compartment driver's side and a second cargo bay door that is pivotally combined with the storage compartment passenger's side, wherein the first and second cargo bay doors are adapted to move between a closed position when the tray is in its retracted position and an open position when the tray is extended toward the respective cargo bay door.

10. The storage system of claim 9 wherein the first hydraulic cylinder barrel and the second hydraulic cylinder barrel are combined together so the barrels cannot move relative to one another.

11. The storage system of claim 9 wherein the first hydraulic cylinder and the second hydraulic cylinder are aligned in the same direction.

12. A method for moving a storage tray between a retracted position in which the storage tray is nested inside of a storage compartment, a first extended position in which the storage tray extends from a first side of the storage compartment, and a second extended position in which the storage tray extends from a second side of the storage compartment, wherein the movement of the tray is caused by a first hydraulic cylinder combined with the storage compartment and a second hydraulic cylinder combined with the storage tray, said method comprising the steps of:
   extending the first cylinder and retracting the second cylinder thereby moving the tray to its first extended position;
   retracting the first cylinder and extending the second cylinder thereby moving the tray to its second extended position;
   retracting both cylinders thereby moving the storage tray to its retracted position.

13. The method of claim 12 wherein the storage compartment further comprises a first cargo bay door combined with the storage compartment first side and a second cargo bay door combined with the storage compartment second side, wherein both doors are pivotally combined with the storage compartment and adapted to move between a closed position and an open position.

14. The method of claim 13 wherein the cargo bay doors are biased in their closed position.

15. The method of claim 14 further comprising the step of pivoting the first cargo bay door from its closed position to its open position by frictional engagement of the tray against the first door as the tray is being hydraulically moved from its retracted position toward the storage compartment first side.

16. The method of claim 14 further comprising the step of pivoting the second cargo bay door from its closed position to its open position by frictional engagement of the tray against the second door as the tray is being hydraulically moved from its retracted position toward the storage compartment second side.

\* \* \* \* \*